United States Patent
Katayama et al.

(10) Patent No.: US 12,206,450 B2
(45) Date of Patent: Jan. 21, 2025

(54) PHASE DIFFERENCE DISTRIBUTION ESTIMATION METHOD AND PHASE DIFFERENCE DISTRIBUTION ESTIMATION APPARATUS

(71) Applicant: NIPPON TELEGRAPH AND TELEPHONE CORPORATION, Tokyo (JP)

(72) Inventors: Yohei Katayama, Musashino (JP); Kazumitsu Sakamoto, Musashino (JP); Kento Yoshizawa, Musashino (JP); Hiroyuki Fukumoto, Musashino (JP); Takuya Ohara, Musashino (JP); Takeshi Kinoshita, Musashino (JP); Etsushi Yamazaki, Musashino (JP); Takayuki Mizuno, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 100 days.

(21) Appl. No.: 18/011,573

(22) PCT Filed: Jun. 23, 2020

(86) PCT No.: PCT/JP2020/024552
§ 371 (c)(1),
(2) Date: Dec. 20, 2022

(87) PCT Pub. No.: WO2021/260784
PCT Pub. Date: Dec. 30, 2021

(65) Prior Publication Data
US 2023/0291471 A1   Sep. 14, 2023

(51) Int. Cl.
*H04B 10/11*        (2013.01)
*H04B 10/112*       (2013.01)
(Continued)

(52) U.S. Cl.
CPC ....... *H04B 10/112* (2013.01); *H04B 10/2557* (2013.01); *G01J 9/00* (2013.01);
(Continued)

(58) Field of Classification Search
CPC .............. H04B 10/112; H04B 10/2557; H04B 10/118; H04B 10/11; H04B 10/60; H04B 10/6165; G01J 9/00; G02B 26/00
(Continued)

(56) References Cited

U.S. PATENT DOCUMENTS 3,923,400 A * 12/1975 Hardy ................... G01J 9/0215
                                                         356/521
4,016,415 A *  4/1977 O'Meara ................. G01J 9/00
                                                         359/291
(Continued)

OTHER PUBLICATIONS

Yongxiong Ren et al., "Adaptive-optics-based simultaneous pre- and post-turbulence compensation of multiple orbital-angular-momentum beams in a bidirectional free-space optical link", Optica, vol. 1, No. 6, pp. 376-382 (2014).

*Primary Examiner* — Dibson J Sanchez

(57) ABSTRACT

A phase difference distribution estimation method includes: receiving an optical signal via a space and detecting a phase of the optical signal; calculating characteristic values related to characteristics of the atmosphere through which the optical signal propagates from the optical signal received in the receiving; estimating a phase difference distribution of an optical signal received after a certain period of time, on the basis of the characteristic values calculated in the calculating; and controlling a phase of an optical signal in the receiving on the basis of the phase difference distribution estimated in the estimating.

4 Claims, 6 Drawing Sheets

(51) Int. Cl.
*H04B 10/2557* (2013.01)
*G01J 9/00* (2006.01)
*G02B 26/00* (2006.01)
*H04B 10/60* (2013.01)
*H04B 10/61* (2013.01)

(52) U.S. Cl.
CPC .............. *G02B 26/00* (2013.01); *H04B 10/11* (2013.01); *H04B 10/60* (2013.01); *H04B 10/6165* (2013.01)

(58) Field of Classification Search
USPC ................................. 398/118–131, 202–214
See application file for complete search history.

(56) References Cited

U.S. PATENT DOCUMENTS

| | | | | |
|---|---|---|---|---|
| 4,645,346 A * | 2/1987 | Fontanella | ............ | G01J 9/0215 356/520 |
| 6,911,637 B1 * | 6/2005 | Vorontsov | ................ | G01J 9/00 359/256 |
| 7,283,251 B1 * | 10/2007 | Tansey | ...................... | G01J 9/02 356/512 |
| 8,229,304 B1 * | 7/2012 | Pepper | ................... | H04B 10/61 398/209 |
| 2002/0024688 A1 * | 2/2002 | Ogasawara | .......... | G11B 7/1369 |
| 2003/0062468 A1 * | 4/2003 | Byren | ................ | G02B 27/0037 250/216 |
| 2005/0045801 A1 * | 3/2005 | Smith | ....................... | G01J 9/00 250/201.9 |
| 2005/0098707 A1 * | 5/2005 | Wirth | ....................... | G01J 9/02 250/201.9 |
| 2005/0180753 A1 * | 8/2005 | Wirth | ..................... | G02B 26/06 398/118 |
| 2006/0227402 A1 * | 10/2006 | Maram | ..................... | G01J 9/00 359/279 |
| 2008/0075409 A1 * | 3/2008 | Liu | ...................... | G02B 6/4246 385/94 |
| 2009/0142073 A1 * | 6/2009 | Smith | ................... | H04B 10/50 398/192 |
| 2010/0080565 A1 * | 4/2010 | Li | ...................... | H04B 10/1121 398/208 |
| 2013/0188194 A1 * | 7/2013 | Wallace | ................... | G01J 9/00 356/477 |
| 2014/0270565 A1 * | 9/2014 | Poyneer | ................ | G06T 3/4053 382/260 |
| 2021/0083779 A1 * | 3/2021 | Arikawa | ............... | H04B 10/118 |
| 2021/0318534 A1 * | 10/2021 | Iwashimizu | ....... | G02B 27/0068 |

* cited by examiner

| $f_A(x, y)$ | | x COORDINATE | | | | |
|---|---|---|---|---|---|---|
| | | −n | −n+1 | ⋯ | n−1 | n |
| y COORDINATE | −m | 0.01 | −0.01 | ⋯ | 0.01 | −0.01 |
| | −m+1 | 0.02 | 0.01 | ⋯ | 0.02 | 0.01 |
| | ⋯ | ⋯ | ⋯ | ⋯ | ⋯ | ⋯ |
| | m−1 | 0.01 | −0.01 | ⋯ | 0.01 | −0.01 |
| | m | 0.02 | 0.01 | ⋯ | 0.02 | 0.01 |

Fig. 4A

| $f_B(x, y)$ | | x COORDINATE | | | | |
|---|---|---|---|---|---|---|
| | | −n | −n+1 | ⋯ | n−1 | n |
| y COORDINATE | −m | 0.02 | −0.02 | ⋯ | 0.03 | −0.02 |
| | −m+1 | 0.01 | 0.03 | ⋯ | 0.01 | 0.03 |
| | ⋯ | ⋯ | ⋯ | ⋯ | ⋯ | ⋯ |
| | m−1 | 0.03 | −0.04 | ⋯ | 0.05 | 0.00 |
| | m | −0.02 | 0.01 | ⋯ | −0.02 | 0.02 |

Fig. 4B

| Cor (dx, dy) | | SLIDE AMOUNT dx IN x COORDINATE DIRECTION | | | | |
|---|---|---|---|---|---|---|
| | | −p | −p+1 | ⋯ | p−1 | p |
| SLIDE AMOUNT dy IN y COORDINATE DIRECTION | q | 0.02 | −0.01 | ⋯ | 0.01 | −0.01 |
| | q−1 | 0.01 | 0.03 | ⋯ | −0.01 | −0.01 |
| | ⋯ | ⋯ | ⋯ | ⋯ | ⋯ | ⋯ |
| | −q+1 | −0.01 | −0.02 | ⋯ | 0.04 | −0.01 |
| | −q | 0.02 | 0.05 | ⋯ | 0.03 | 0.06 |

Fig. 5

| CorAve(dx, dy) | | SLIDE AMOUNT dx IN x COORDINATE DIRECTION | | | | |
|---|---|---|---|---|---|---|
| | | -2 | -1 | 0 | 1 | 2 |
| SLIDE AMOUNT dy IN y COORDINATE DIRECTION | 2 | 0.02 | -0.01 | 0 | 0.01 | -0.01 |
| | 1 | 0.01 | 0.2 | 0.01 | -0.01 | -0.01 |
| | 0 | 0.15 | 0.04 | -0.01 | 0.03 | 0.02 |
| | -1 | -0.01 | -0.02 | 0.01 | 0.04 | -0.01 |
| | -2 | 0.02 | 0.04 | 0.01 | 0.03 | 0.09 |

Fig. 6A

| | CorAve(dx, dy) | dx | dy |
|---|---|---|---|
| VALUE OF CorAve (dx, dy) TO BE SELECTED AND VALUES OF dx AND dy AT THAT TIME | 0.15 | -2 | 0 |
| | 0.2 | -1 | 1 |
| | 0.09 | 2 | -2 |

Fig. 6B

PHASE DIFFERENCE DISTRIBUTION ESTIMATION METHOD AND PHASE DIFFERENCE DISTRIBUTION ESTIMATION APPARATUS

CROSS-REFERENCE TO RELATED APPLICATIONS

This application is a 371 U.S. National Phase of International Application No. PCT/JP2020/024552, filed on Jun. 23, 2020. The entire disclosure of the above application is incorporated herein by reference.

TECHNICAL FIELD

The present disclosure relates to a phase difference distribution estimation method and a phase difference distribution estimation device (a phase difference distribution estimation apparatus).

BACKGROUND ART

Wireless communication using light having a shorter wavelength than radio waves is used. Wireless communication using light has higher power efficiency, communication capacity, and directivity than wireless communication using radio waves.

When wireless communication using light is used for communicating between a communication station placed on the earth and a communication station placed on, for example, a star outside the atmosphere such as the moon, unfortunately, intensity of an optical signal transmitted/received by the communication station placed on the earth is significantly attenuated due to the influence of atmospheric fluctuation on the earth. To solve such circumstances, NPL 1 discloses a technique of preventing power attenuation of an optical signal by performing in advance compensation processing on an optical signal to be transmitted, using an optical signal received by a communication station placed on the earth from another communication station.

CITATION LIST

Non Patent Literature

NPL 1: Yongxiong Ren et al., "Adaptive-Optics-based Simultaneous pre- and post-Turbulence compensation of multiple orbital-angular-momentum beams in a bidirectional free-space optical link", Optica, Vol. 1, No. 6, pp. 376-382 (2014)

SUMMARY

Technical Problem

When a wavefront is shaped upon receiving an optical signal, a difference may occur between the timing of detecting the wavefront and the timing of shaping the wavefront. Therefore, an error may occur in the shaping of the wavefront. This error can be reduced if the wavefront at the time of shaping can be estimated using a detected wavefront, but an optical signal received after propagating through the atmosphere is affected by a plurality of atmospheric layers having different movement speeds, which makes it difficult to estimate a phase difference of the wavefront.

The present disclosure has been made to solve the above circumstances, and an object of the present disclosure is to provide a method for estimating a phase difference distribution of a wavefront of an optical signal and a device for estimating the phase difference distribution.

Means for Solving the Problem

One aspect of the present invention is a phase difference distribution estimation method including: receiving an optical signal via a space; calculating characteristic values related to characteristics of the space through which the optical signal propagates, from the optical signal received in the receiving; estimating a phase difference distribution of an optical signal received after a certain period of time, on the basis of the characteristic values calculated in the calculating; and controlling a phase of an optical signal in the receiving on the basis of the phase difference distribution estimated in the estimating.

Effects

The present disclosure can provide a method for estimating a phase difference distribution of a wavefront of an optical signal and a device for estimating the phase difference distribution.

BRIEF DESCRIPTION OF DRAWINGS

FIG. 4A is a table illustrating an example of a phase difference distribution A.

FIG. 4B is a table illustrating an example of a phase difference distribution B.

FIG. 5 is a table illustrating an example of cross-correlation values between calculated phase difference distributions.

FIG. 6A is an example of a table illustrating average values of cross-correlation values between phase difference distributions.

FIG. 6B is an example of a table illustrating selected average values.

DESCRIPTION OF EMBODIMENTS

First Embodiment

Hereinafter, embodiments of the present disclosure will be described in detail with reference to the drawings.

Figure 1:
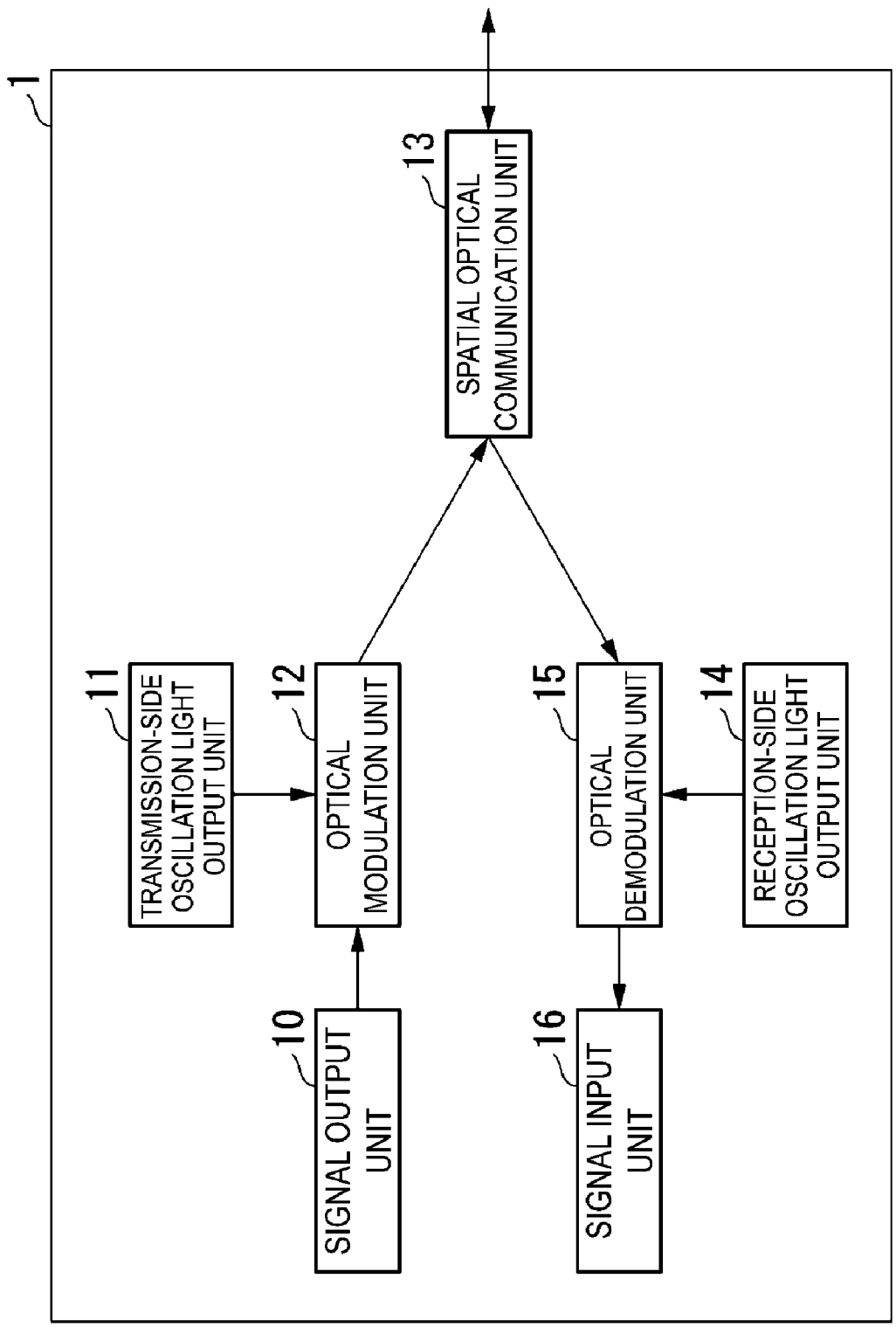
FIG. 1 is a diagram illustrating the configuration of a communication apparatus according to a first embodiment.

FIG. 1 is a diagram illustrating the configuration of a communication apparatus 1 according to a first embodiment.

The communication apparatus 1 includes a signal output unit 10, a transmission-side oscillation light output unit 11, an optical modulation unit 12, a spatial optical communication unit 13, a reception-side oscillation light output unit 14, an optical demodulation unit 15, and a signal input unit 16 (an optical receiver).

The signal output unit 10 outputs an electric signal indicating information to be transmitted to a communication partner to the optical modulation unit 12. That is, an output end of the signal output unit 10 is connected to an input end of the optical modulation unit 12 via an electric cable.

The transmission-side oscillation light output unit 11 outputs oscillation light serving as a carrier of an optical signal to the optical modulation unit 12. That is, an output end of the transmission-side oscillation light output unit 11 is connected to the input end of the optical modulation unit 12 via an optical cable.

The optical modulation unit 12 modulates the oscillation light input from the transmission-side oscillation light output unit 11 by using a signal input from the signal output unit 10. The optical modulation unit 12 outputs an optical signal generated by the optical modulation to the spatial optical communication unit 13. That is, an output end of the optical modulation unit 12 is connected to an input end of the spatial optical communication unit 13 via an optical cable.

The spatial optical communication unit 13 is an optical antenna provided so as to face a communication partner. The spatial optical communication unit 13 converts an optical signal input to a transmission port into an optical wireless signal and transmits the optical wireless signal. On the other hand, the spatial optical communication unit 13 converts a received optical wireless signal into an optical signal and outputs the optical signal from a reception port. A transmission port of the spatial optical communication unit 13 is connected to the optical modulation unit 12 via an optical cable, and the reception port is connected to an input end of the optical demodulation unit 15 via an optical cable.

The reception-side oscillation light output unit 14 outputs oscillation light to the optical demodulation unit 15. The optical demodulation unit 15 demodulates the optical signal input from the spatial optical communication unit 13 by using the oscillation light input from the reception-side oscillation light output unit 14, and outputs the demodulated signal to the signal input unit 16. The signal input unit 16 receives the signal from the optical demodulation unit 15. The optical demodulation unit 15 generates an electric signal by demodulating the optical signal input from the spatial optical communication unit 13, using the oscillation light input from the reception-side oscillation light output unit 14. The optical demodulation unit 15 outputs the generated electric signal to the signal input unit 16. An output end of the optical demodulation unit 15 is connected to an input end of the signal input unit 16 via an electric cable.

The signal input unit 16 receives the signal from the optical demodulation unit 15.

Figure 2:
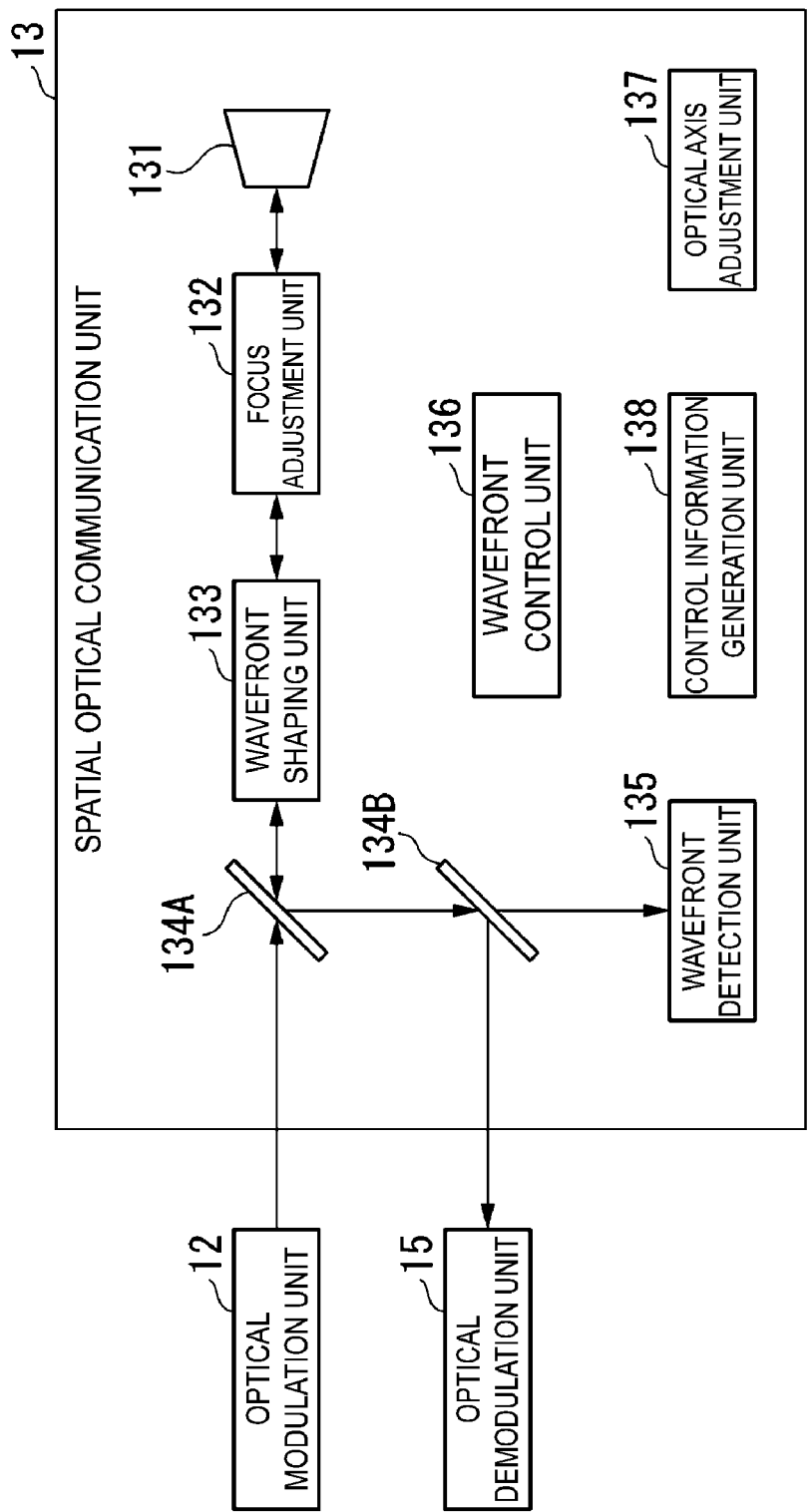
FIG. 2 is a configuration example of a spatial optical communication unit according to the first embodiment.

FIG. 2 is a configuration example of the spatial optical communication unit 13 according to the first embodiment.

The spatial optical communication unit 13 includes an antenna 131, a focus adjustment unit 132, a wavefront shaping unit 133, a half mirror 134A, a half mirror 134B, a wavefront detection unit 135, a wavefront control unit 136, an optical axis adjustment unit 137, and a control information generation unit 138.

The antenna 131 allows a received optical wireless signal to be incident on the focus adjustment unit 132. The antenna 131 transmits an optical wireless signal incident from the focus adjustment unit 132 to a communication partner. The antenna 131 includes a plurality of mirrors. The focus adjustment unit 132 adjusts the focus of an optical wireless signal incident from the antenna 131 and the wavefront shaping unit 133, under the control of the wavefront control unit 136. The focus adjustment unit 132 allows the optical wireless signal incident from the wavefront shaping unit 133 to be incident on the antenna 131 and allows the optical wireless signal incident from the antenna 131 to be incident on the wavefront shaping unit 133. The wavefront shaping unit 133 corrects the wavefront of an optical wireless signal incident from the half mirror 134A and the focus adjustment unit 132, under the control of the wavefront control unit 136. The wavefront shaping unit 133 allows the optical wireless signal incident from the focus adjustment unit 132 to be incident on the half mirror 134A and allows the optical wireless signal incident from the half mirror 134A to be incident on the focus adjustment unit 132. Configuration examples of the wavefront shaping unit 133 include a variable mirror.

The half mirror 134A reflects a part of the optical wireless signal incident from the wavefront shaping unit 133. The half mirror 134A is placed such that the reflected light is incident on the half mirror 134B. The half mirror 134A transmits a part of the optical wireless signal incident from the optical modulation unit 12 to be incident on the wavefront shaping unit 133. The half mirror 134B reflects a part of the optical wireless signal incident from the half mirror 134A to be incident on the optical demodulation unit 15. The half mirror 134B transmits a part of the optical wireless signal incident from the half mirror 134A to be incident on the wavefront detection unit 135. The wavefront detection unit 135 detects a wavefront of the optical wireless signal incident from the half mirror 134B.

The wavefront control unit 136 controls the focus adjustment unit 132, the wavefront shaping unit 133, and the optical axis adjustment unit 137 in accordance with data generated by the control information generation unit 138. The optical axis adjustment unit 137 adjusts an optical axis of an optical wireless signal under the control of the wavefront control unit 136. The optical axis adjustment unit 137 adjusts the optical axis by adjusting, for example, an angle of components constituting the communication apparatus 1. The control information generation unit 138 estimates a wavefront after a certain period of time using the wavefront detected by the wavefront detection unit 135, and outputs data indicating the estimated wavefront to the wavefront control unit 136. The certain period of time described herein means, for example, a time obtained by adding half the time of a cycle of the wavefront detection process to a latency from detecting a wavefront to controlling the wavefront.

Figure 3:
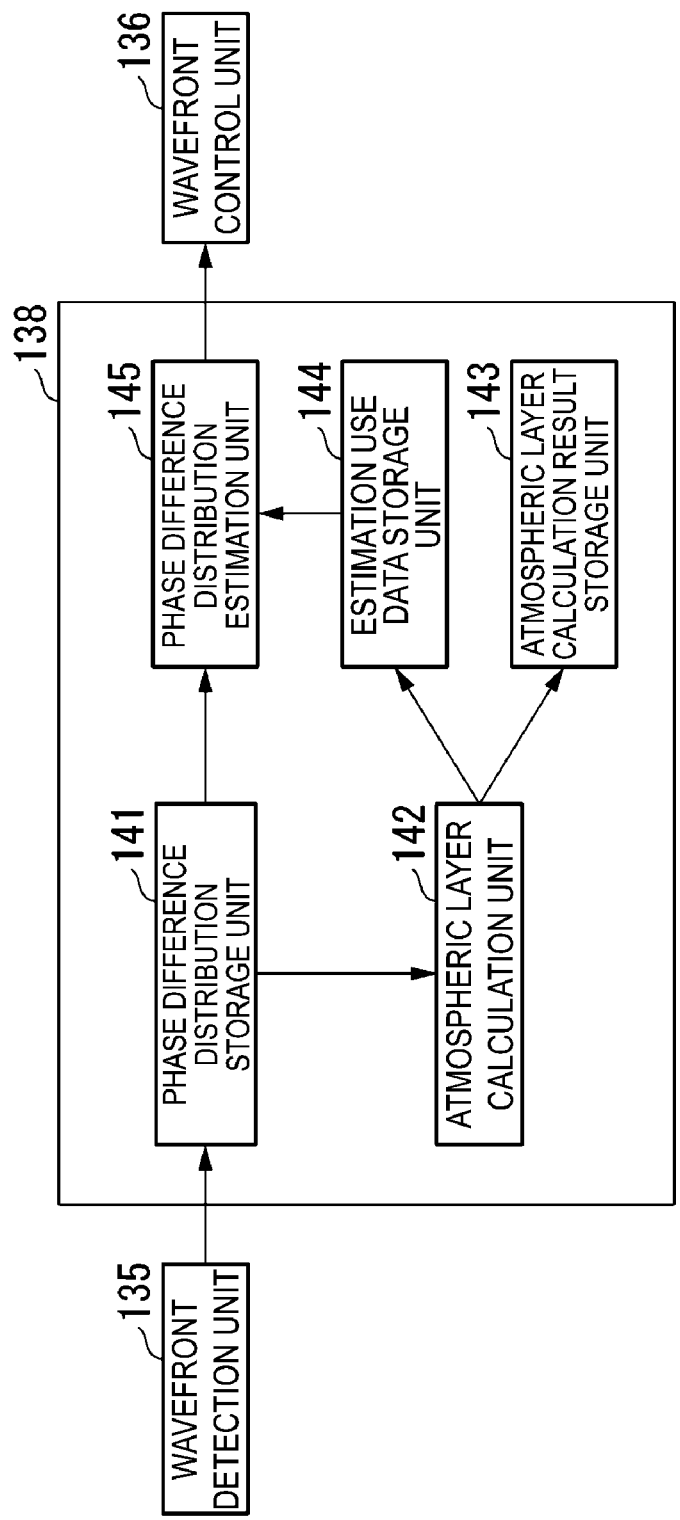
FIG. 3 is a diagram illustrating the configuration of a control information generation unit according to the first embodiment.

FIG. 3 is a diagram illustrating the configuration of the control information generation unit 138 according to the first embodiment.

The control information generation unit 138 includes a phase difference distribution storage unit 141, an atmospheric layer calculation unit 142, an atmospheric layer calculation result storage unit 143, and a phase difference distribution estimation unit 145.

The phase difference distribution storage unit 141 stores a phase difference distribution of the wavefront of the optical signal detected by the wavefront detection unit 135. The atmospheric layer calculation unit 142 calculates the velocity of an atmospheric layer that affects an optical signal and measures (characteristic values related to the characteristics of the atmosphere) of the magnitude of the influence in accordance with the phase difference distribution stored in the phase difference distribution storage unit 141. The atmospheric layer calculation unit 142 records data used by the phase difference distribution estimation unit 145 in an estimation use data storage unit 144. The atmospheric layer calculation result storage unit 143 and the estimation use data storage unit 144 store results obtained by the calculation by the atmospheric layer calculation unit 142. The phase difference distribution estimation unit 145 estimates a phase difference distribution after a certain period of time using the phase difference distribution of the wavefront of the optical signal recorded in the phase difference distribution storage unit 141 and the characteristic values related to the characteristics of the atmosphere recorded in the estimation use data storage unit 144, and outputs the estimated phase difference distribution to the wavefront control unit 136.

Calculation Method by Atmospheric Layer Calculation Unit 142

The wavefront detection unit 135 detects a phase difference distribution of a wavefront according to a prescribed cycle. Two phase difference distributions detected at the latest time have been recorded in the phase difference distribution storage unit 141. When the wavefront detection unit 135 newly detects a wavefront, data of a phase difference distribution with an earlier detection time between the two phase difference distributions is updated to data of the newly detected wavefront. The atmospheric layer calculation unit 142 calculates characteristic values related to the characteristics of the atmosphere using data of the two phase difference distributions.

The data of the two phase difference distributions are referred to as a "phase difference distribution A" and a "phase difference distribution B", and it is assumed that the phase difference distribution B has an earlier observation time than the phase difference distribution A. The phase difference distribution A and the phase difference distribution B indicate phases of optical signals at detection positions on a two-dimensional plane in the wavefront detection unit 135. The phase difference distribution A and the phase difference distribution B are represented as, for example, three-dimensional data (x, y, f(x, y)). The symbols x and y are numerical values representing two-dimensional coordinates of a detection position in the wavefront detection unit 135. The symbol x is an integer satisfying $-n \leq x \leq n$, y is an integer satisfying $-m \leq y \leq m$, and n and m are positive integers. Herein, f(x, y) is the phase of an optical signal detected at a detection position indicated by x and y.

FIG. 4A is a table illustrating an example of the phase difference distribution A.

FIG. 4B is a table illustrating an example of the phase difference distribution B.

FIGS. 4A and 4B illustrate matrices each indicating detection positions in a two-dimensional plane with y coordinates in rows and x coordinates in columns. In the matrix representing the phase difference distribution A, values of phase $f_A(x, y)$ at detection positions (x, y) are stored for each of the detection positions. Similarly, in the matrix representing the phase difference distribution B, values of phase $f_B(x, y)$ at detection positions (x, y) are stored for each of the detection positions.

The atmospheric layer calculation unit 142 calculates cross-correlation values between $f_A(x, y)$ and $f_B(x, y)$. The atmospheric layer calculation unit 142 calculates the cross-correlation values by using the following Equation (1).

[Math. 1]
$$Cor(dx, dy) = \sum_{y=-q}^{q} \sum_{x=-p}^{p} \frac{2 f_A(x, y) f_B(x+dx, y+dy)}{f_A(x, y)^2 + f_B(x+dx, y+dy)^2} \quad (1)$$

In Equation (1) above, dx and dy denote an amount obtained by translating the value of $f_B(x, y)$ in an x direction and an amount obtained by translating the value of $f_B(x, y)$ in a y direction, respectively, and (dx, dy) is referred to as a "two-dimensional slide amount". Herein, Cor (dx, dy) denotes cross-correlation values between $f_A(x, y)$ and $f_B(x, y)$ when $f_B(x, y)$ is moved by the two-dimensional slide amount (dx, dy). The symbols dx and dy are changed in the range of $-p \leq dx \leq p$ and $-q \leq dy \leq q$. Here, p and q are positive integers. Furthermore, $p \leq n/2$ and $q \leq m/2$ are satisfied, and the sum of Cor (dx, dy) is calculated in the range of $-p \leq x \leq p$ and $-q \leq y \leq q$. At this time, even though dx and dy are changed, $-n \leq x+dx \leq n$ and $-m \leq y+dy \leq m$ are satisfied, and values of $f_B(x+dx, y+dy)$ can be defined. Furthermore, the number of terms used in the sum calculation in Equation (1) above is the same regardless of the value of the two-dimensional slide amount (dx, dy).

FIG. 5 is a table illustrating an example of cross-correlation values between calculated phase difference distributions.

The atmospheric layer calculation unit 142 calculates the cross-correlation values Cor (dx, dy) between phase difference distributions by Equation (1) above for each combination of the two-dimensional slide amounts (dx, dy). The cross-correlation value for each two-dimensional slide amount is recorded in the atmospheric layer calculation result storage unit 143. The atmospheric layer calculation unit 142 calculates a standard deviation of the cross-correlation values.

The phase difference distribution A and the phase difference distribution B recorded in the phase difference distribution storage unit 141 are updated at a certain cycle $t_1$. Each time data is updated, the atmospheric layer calculation unit 142 calculates cross-correlation values and a standard deviation of the cross-correlation values. That is, a plurality of cross-correlation values based on phase difference distributions at different timings for one two-dimensional slide amount (dx, dy) are recorded in the atmospheric layer calculation result storage unit 143. The atmospheric layer calculation unit 142 calculates an average value of cross-correlation values for each two-dimensional slide amount.

Then, the atmospheric layer calculation unit 142 selects an average value that is at least a constant multiple of a standard deviation of the most recently calculated cross-correlation values from the average values of the cross-correlation values. The constant multiple may be any value as long as it is a preset value. Then, the atmospheric layer calculation unit 142 records the average value and a two-dimensional slide amount (dx, dy) associated to the average value, in the estimation use data storage unit 144. That is, the atmospheric layer calculation unit 142 checks to set the two-dimensional slide amount (dx, dy) such that the cross-correlation value is a relatively large value.

FIG. 6A is an example of a table illustrating average values of cross-correlation values between phase difference distributions.

FIG. 6B is an example of a table illustrating selected average values.

FIG. 6A illustrates average values of cross-correlation values between phase difference distributions when $-2 \leq dx \leq 2$ and $-2 \leq dy \leq 2$ are satisfied. An average value CorAve (dx, dy) of the cross-correlation values is an average value for each of the two-dimensional slide amounts (dx, dy) of the cross-correlation values Cor (dx, dy) between the phase difference distributions. At this time, a standard deviation of Cor (dx, dy) most recently calculated by the atmospheric layer calculation unit 142 is 0.005, and it is assumed that the atmospheric layer calculation unit 142 selects Corave (dx, dy) of 0.05 or more, which is 10 times this standard deviation. FIG. 6B is an example of a table illustrating the selected average value.

Of the average values of the cross-correlation values illustrated in FIG. 6A, the average value is 0.05 or more when the two-dimensional slide amount (dx, dy) is (−2, 0), (−1, 1), and (2, −2). Each value of the average values CorAve (dx, dy) of the cross-correlation values at this time is 0.15, 0.2, and 0.09. This data is recorded in the estimation use data storage unit 144.

Each time the data recorded in the phase difference distribution storage unit 141 is updated, an average value to be calculated by the atmospheric layer calculation unit 142 is also changed, and an average value to be selected is also different. The atmospheric layer calculation unit 142 updates the data recorded in the estimation use data storage unit 144 each time the calculation results are different.

Hereinafter, the reason why the atmospheric layer calculation unit 142 selects an average value that is at least a constant multiple of a standard deviation will be described. A phase difference in an optical signal may be affected by an atmospheric layer through which the optical signal propagates. The atmospheric layer includes layers of the atmosphere having a different movement speed, and optical signals undergo different phase changes by propagating through the atmospheric layer having a different movement speed. The number of average values to be selected associates to the number of atmospheric layers that affect optical signals. This is because a large cross-correlation value between a phase difference distribution translated by a specific two-dimensional slide amount and an immediately following phase difference distribution indicates the fact that the phase difference distribution has moved by the specific two-dimensional slide amount. Accordingly, the two-dimensional slide amount (dx, dy) represents a distance at which an air layer may travel during $t_1$ which is an interval between phase difference distribution observation times, and the average value CorAve (dx, dy) of the cross-correlation values represents a measure of the influence of the atmospheric layer on an optical signal detected. That is, the two-dimensional slide amount and the average value of the cross-correlation values are examples of characteristic values related to the characteristics of the atmosphere.

Estimation Method by Phase Difference Distribution Estimation Unit 145

The phase difference distribution estimation unit 145 estimates a phase after a certain period of time $t_2$ (for example, time obtained by adding half of a time interval to be controlled to a latency time from detecting a wavefront to controlling the wavefront) in accordance with the latest phase difference distribution A recorded in the phase difference distribution storage unit 141, the average value of the cross-correlation values for each two-dimensional slide amount recorded in the estimation use data storage unit 144, and a two-dimensional slide amount associated to the average value. A phase difference distribution $f_C$ (x, y) after the certain period of time $t_2$ is calculated by Equation (2) below.

[Math. 2]

$$f_C(x,y) = \Sigma \text{CorAve}(dx,dy) \times f_A(x-\delta \times dx, y-\delta \times dy) \quad (2)$$

The symbol $\delta$ is a value obtained by dividing $t_2$ by the interval $t_1$ of phase difference distribution data update time. The phase difference distribution estimation unit 145 calculates the sum of products of the average values of the cross-correlation values for each two-dimensional slide amount recorded in the estimation use data storage unit 144 and phases slid by the two-dimensional slide amount associated to the average value.

For example, when the two-dimensional slide amounts illustrated in FIG. 6B and the average values of the cross-correlation values at that time are selected, the phase difference distribution $f_C$ (x, y) after the certain period of time $t_2$ is calculated by Equation (3) below.

[Math. 3]

$$f_C(x, y) = 0.15 \times f_A\left(x + 2\frac{t_2}{t_1}, y\right) + \\ 0.2 \times f_A\left(x + \frac{t_2}{t_1}, y - \frac{t_2}{t_1}\right) + 0.09 \times f_A\left(x - 2\frac{t_2}{t_1}, y + 2\frac{t_2}{t_1}\right) \quad (3)$$

The phase difference distribution estimation unit 145 estimates a wavefront after the certain period of time $t_2$ in accordance with the calculation result. The wavefront control unit 136 adjusts a phase of the wavefront in accordance with the phase difference distribution estimated by the phase difference distribution estimation unit 145. Specifically, the wavefront control unit 136 controls the wavefront shaping unit 133 such that the wavefront shaping unit 133 adds an opposite phase of an estimated phase difference to the wavefront.

Operation of System

Next, the estimation method according to the present embodiment will be described.

Figure 7:
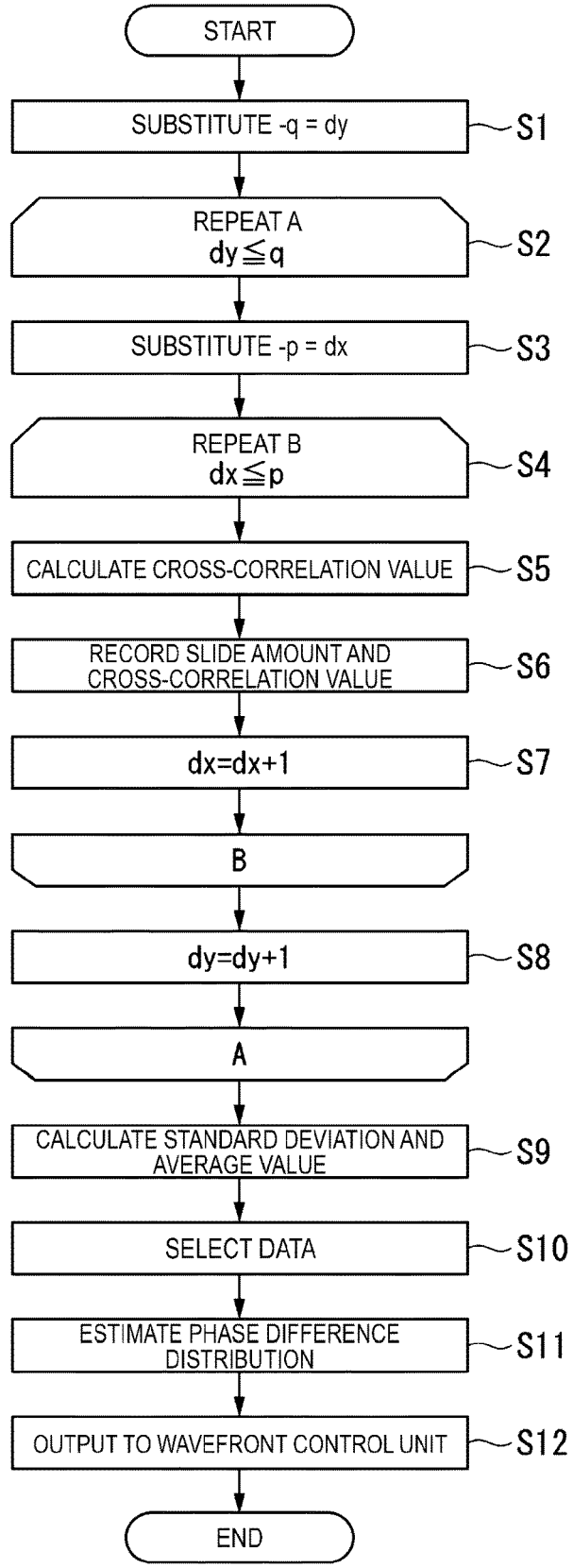
FIG. 7 is a flowchart illustrating an operation of the control information generation unit according to the first embodiment.

FIG. 7 is a flowchart illustrating an operation of the control information generation unit 138 according to the first embodiment.

The atmospheric layer calculation unit 142 first substitutes −q, which is a minimum value of values that dy can take, for a slide amount dy (step S1). Then, the atmospheric layer calculation unit 142 repeatedly performs step S3 to step S8 while dy≤q is satisfied (step S2).

The atmospheric layer calculation unit 142 substitutes −p, which is a minimum value of values that dx can take, for dx (step S3). The atmospheric layer calculation unit 142 repeatedly performs processing of step S5 to step S7 while dx≤p is satisfied (step S4). The atmospheric layer calculation unit 142 slides the phase difference distribution B by the two-dimensional slide amount (dx, dy) in accordance with the phase difference distribution A and the phase difference distribution B recorded in the phase difference distribution storage unit 141, thereby calculating a cross-correlation value between the phase difference distribution A and the phase difference distribution B (step S5). The atmospheric layer calculation unit 142 records the calculated cross-correlation value in the atmospheric layer calculation result storage unit 143 in association with a slide amount (dx, dy) at this time (step S6). The atmospheric layer calculation unit 142 adds 1 to the value of dx (step S7).

When performing the processing of step S5 to step S7 until the slide amount dx reaches p, the atmospheric layer calculation unit 142 adds 1 to the value of dy (step S8).

That is, the atmospheric layer calculation unit 142 calculates cross-correlation values between phase difference distributions in all the two-dimensional slide amounts in the range of −p≤dx≤p and −q≤dy≤q in the processing in step S1 to step S8.

Then, the atmospheric layer calculation unit 142 calculates a standard deviation of the most recently calculated cross-correlation values and average values of the cross-correlation values for each of the two-dimensional slide amounts (step S9). The atmospheric layer calculation unit 142 selects an average value that is at least a constant multiple of the most recently calculated standard deviation from the average values, and records the selected average value and a two-dimensional slide amount associated to the selected average value, in the estimation use data storage unit 144 (step S10).

The phase difference distribution estimation unit 145 estimates a phase difference distribution after a certain period of time from the phase difference distribution A recorded in the phase difference distribution storage unit 141 and the two-dimensional slide amount associated to the average value selected by the atmospheric layer calculation unit 142 in step S10 (step S11). Then, the phase difference distribution estimation unit 145 generates control data in accordance with the estimation result and outputs the control data to the wavefront control unit 136 (step S12).

Actions and Effects

In this way, according to the present embodiment, one of two phase difference distributions having different observation times is slid with different displacement amounts, and a cross-correlation value between the two phase difference distributions is calculated for each of the displacement amounts. Then, in accordance with an average value and a standard deviation of the cross-correlation values, a displacement amount in which a cross-correlation value becomes relatively large and the cross-correlation value are selected. This displacement amount is an index of the velocity of an atmospheric layer. The cross-correlation value in this displacement amount represents an index of the magnitude of the influence of the atmospheric layer on an optical signal. So, an atmospheric layer that affects an optical wireless signal is estimated by using this data, so that a phase difference distribution after a certain period of time can be estimated, and a control error in wavefront shaping can be reduced.

OTHER EMBODIMENTS

Hitherto, the embodiments of the present disclosure have been described in detail with reference to the drawings, but the specific configuration is not limited to the above description, and various design changes and the like can be made in a range without departing from the gist of the present disclosure.

The communication apparatus 1 according to the aforementioned embodiment corrects the influence of the atmosphere on the wavefront of an optical signal, but may correct the wavefront of an optical signal that propagates through a space other than the atmosphere. For example, when an optical signal propagates through a space filled with a medium other than air, such as underwater, the communication apparatus 1 may estimate a layer of the medium and the velocity of the layer in the same manner as in the present method and correct the optical signal.

The phase difference distribution storage unit 141 may record three or more phase difference distributions. In this case, the atmospheric layer calculation unit 142 selects two pieces of data from data recorded in the phase difference distribution storage unit 141 so that a detected time interval is constant. For example, when phase difference distribution data having a constant observation time interval are recorded as A0, A1, A2, A3, A4 . . . in the order of earliest observation time, the atmospheric layer calculation unit 142 may select A0 and A2 or A1 and A3, or may select A0 and A3 or A1 and A4. At this time, the update time interval $t_1$ needs to be a difference between observation times of the two pieces of data selected by the atmospheric layer calculation unit 142.

The phase difference distribution storage unit 141, the atmospheric layer calculation result storage unit 143, and the estimation use data storage unit 144 may be external databases, and the atmospheric layer calculation unit 142 and the phase difference distribution estimation unit 145 may acquire data from the external database.

Furthermore, the atmospheric layer calculation unit 142 and the phase difference distribution estimation unit 145 may not operate in cooperation with each other, and for example, the phase difference distribution estimation unit 145 may operate independently on the basis of data recorded in the estimation use data storage unit 144.

The atmospheric layer calculation unit 142 calculates a cross-correlation value between phase difference distributions, but it may be calculated by an equation that divides Equation (1) above by the number of terms used in a sum calculation. In this case, since it is not necessary to make the number of terms used in the sum calculation the same depending on the value of the two-dimensional slide amount (dx, dy), values of p and q for determining the range of dx and dy are required to satisfy p≤n and q≤m, respectively.

Furthermore, the atmospheric layer calculation unit 142 selects an average value that is at least a constant multiple of a standard deviation of phase difference distributions among average values of cross-correlation values between the phase difference distributions, but the selection criterion may not be a constant multiple of the standard deviation. For example, the average value may be selected on the basis of a value calculated by a dispersion of the average value, or an average value of a certain constant or more may be selected without using a statistical value.

The control information generation unit includes a central processing unit (CPU) (a processor), a memory, an auxiliary storage device, and the like connected by a bus, and serves as a device including an atmospheric layer calculation unit and a phase difference distribution estimation unit by executing a program. All or a part of the functions of the phase difference distribution estimation device may be implemented by using hardware (a circuitry) such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disc, a ROM, or a CD-ROM, or a storage device such as a hard disk incorporated in a computer system. The program may be transmitted via an electrical communication line.

REFERENCE SIGNS LIST

1 Communication apparatus
10 Signal output unit
11 Transmission-side oscillation light output unit
12 Optical modulation unit
13 Spatial optical communication unit
14 Reception-side oscillation light output unit
15 Optical demodulation unit
16 Signal input unit
131 Antenna
132 Focus adjustment unit
133 Wavefront shaping unit
134A, 134B Half mirror
135 Wavefront detection unit
136 Wavefront control unit
137 Optical axis adjustment unit
138 Control information generation unit 141 Phase difference distribution storage unit
142 Atmospheric layer calculation unit
143 Atmospheric layer calculation result storage unit
144 Estimation use data storage unit
145 Phase difference distribution estimation unit

The invention claimed is:

1. A phase difference distribution estimation method, comprising:
receiving an optical signal via a space;
calculating, from the optical signal received in the receiving, a characteristic value indicative of layers of the atmosphere through which the optical signal propagates, the layers of the atmosphere having different movement speeds;
estimating a phase difference distribution of an optical signal received after a certain period of time, in accordance with the characteristic value calculated in the calculating; and
controlling a phase of the optical signal in the receiving, in accordance with the phase difference distribution estimated in the estimating.

2. A phase difference distribution estimation method, comprising:
receiving an optical signal via a space;
calculating, from the optical signal received in the receiving, a characteristic value related to a characteristic of the space through which the optical signal propagates;
estimating a phase difference distribution of an optical signal received after a certain period of time, in accordance with the characteristic value calculated in the calculating; and
controlling a phase of the optical signal in the receiving, in accordance with the phase difference distribution estimated in the estimating;
specifying a first phase difference distribution being a phase difference distribution of the optical signal received at a first timing in the receiving and a second phase difference distribution being a phase difference distribution of the optical signal received at a second timing that is a timing after the first timing in the receiving;
calculating a cross-correlation value on a displacement amount basis in accordance with the first phase difference distribution and a plurality of comparative distributions obtained by translating the second phase difference distribution in a plane perpendicular to an optical axis while changing the displacement amount; and
calculating a threshold from a statistical value of the cross-correlation values,
wherein, in the calculating of the characteristic value, the characteristic cross-correlation value that is a characteristic cross-correlation value equal to or more than the threshold and the displacement amount that is a characteristic displacement amount in calculating the characteristic cross-correlation value are calculated as the characteristic value.

3. The phase difference distribution estimation method according to claim 2, further comprising:
updating the second phase difference distribution and the first phase difference distribution according to passage of time; and
calculating, in accordance with a cross-correlation value for a plurality of the displacement amounts specified at different times, an average value of the cross-correlation value on the displacement amount basis,
wherein, in the calculating of the characteristic value, the average value that is a characteristic cross-correlation value equal to or more than the threshold is calculated as the characteristic value.

4. A phase difference distribution estimation device, comprising:
an optical receiver configured to receive an optical signal via a space;
a processor, a circuitry or a combination thereof configured to:
calculate a characteristic value indicative of layers of the atmosphere through which the optical signal propagates, from the optical signal received by the optical receiver, the layers of the atmosphere having different movement speeds;
estimate a phase difference distribution of an optical signal received after a certain period of time, in accordance with the characteristic value; and
control phase modulation of an optical signal by the optical receiver, in accordance with the phase difference distribution.

* * * * *